(12) United States Patent
Guo et al.

(10) Patent No.: US 9,560,671 B2
(45) Date of Patent: Jan. 31, 2017

(54) METHOD AND BASE STATION FOR TRANSMITTING SCHEDULING INFORMATION

(71) Applicant: SHARP KABUSHIKI KAISHA, Osaka-shi, Osaka (JP)

(72) Inventors: Ziyuan Guo, Shanghai (CN); Renmao Liu, Shanghai (CN); Ming Ding, Shanghai (CN)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/770,971

(22) PCT Filed: Jan. 13, 2014

(86) PCT No.: PCT/CN2014/070512
§ 371 (c)(1),
(2) Date: Aug. 27, 2015

(87) PCT Pub. No.: WO2014/134976
PCT Pub. Date: Sep. 12, 2014

(65) Prior Publication Data
US 2016/0007375 A1    Jan. 7, 2016

(30) Foreign Application Priority Data

Mar. 6, 2013 (CN) .......................... 2013 1 0071202

(51) Int. Cl.
*H04B 7/14* (2006.01)
*H04J 1/14* (2006.01)
(Continued)

(52) U.S. Cl.
CPC ........ *H04W 72/1289* (2013.01); *H04L 5/1469* (2013.01); *H04L 12/18* (2013.01)

(58) Field of Classification Search
None
See application file for complete search history.

(56) References Cited

U.S. PATENT DOCUMENTS

| 2010/0246456 A1* | 9/2010 | Suo | H04B 7/2656 370/280 |
| 2011/0267993 A1* | 11/2011 | Seo | H04B 7/2656 370/279 |

(Continued)

OTHER PUBLICATIONS

Qualcomm Incorporated, "Resource Allocation Methods for NCT," 3GPP TSG-RAN WG1 #71, R1-125117, New Orleans, USA, Nov. 12-16, 2012, pp. 1-2.

*Primary Examiner* — Edan Orgad
*Assistant Examiner* — Sithu Ko
(74) *Attorney, Agent, or Firm* — Birch, Stewart, Kolasch & Birch, LLP

(57) ABSTRACT

The present disclosure provides a method and base station for transmitting scheduling information. The method comprises: determining that a downlink subframe corresponding to the uplink subframe according to a first scheduling timing corresponding to a first Time Division Duplex (TDD) uplink and downlink configuration scheme of a plurality of TDD uplink and downlink configuration schemes is unavailable for transmitting the scheduling information; obtaining a first equivalent TDD uplink and downlink configuration scheme by treating one or more downlink subframes, including the downlink subframe, in a radio frame as uplink subframes; selecting a downlink subframe corresponding to the uplink subframe according to a second scheduling timing corresponding to a second TDD uplink and downlink configuration scheme of the plurality of TDD uplink and downlink configuration schemes, wherein a set of downlink subframes specified in the second TDD uplink and downlink configuration scheme is a subset of a set of downlink subframes (Continued)

specified in the first equivalent TDD uplink and downlink configuration scheme; and transmitting the scheduling information in the selected downlink subframe.

3 Claims, 2 Drawing Sheets

(51) Int. Cl.
*H04W 72/12* (2009.01)
*H04L 5/14* (2006.01)
*H04L 12/18* (2006.01)

(56) References Cited

U.S. PATENT DOCUMENTS

| | | | |
|---|---|---|---|
| 2012/0069778 A1* | 3/2012 | Zhang | H04L 5/14 370/279 |
| 2013/0155915 A1* | 6/2013 | Park | H04L 5/14 370/280 |
| 2013/0188516 A1* | 7/2013 | He | H04W 28/16 370/254 |
| 2013/0272170 A1* | 10/2013 | Chatterjee | H04W 28/02 370/280 |
| 2014/0086112 A1* | 3/2014 | Stern-Berkowitz | H04W 72/1289 370/280 |
| 2014/0126432 A1* | 5/2014 | Wang | H04B 7/2656 370/280 |

* cited by examiner

METHOD AND BASE STATION FOR TRANSMITTING SCHEDULING INFORMATION

TECHNICAL FIELD

The present disclosure relates to mobile communications, and in particular, to a method and base station for transmitting scheduling information.

BACKGROUND

In the 3rd Generation Partner Project (3GPP) Long Term Evolution (LTE) system, a base station (also referred to as a NodeB or an evolved NodeB (eNB)) transmits scheduling information (for example, Uplink (UL) grant) on a Physical Downlink Control Channel (PDCCH)/enhanced Physical Downlink Control Channel (ePDCCH). A User Equipment (UE) reads the scheduling information on the PDCCH/ePDCCH, and transmits uplink data in uplink subframes indicated by the scheduling information. Here, the UE may be a user terminal, a user node, a mobile terminal, or a tablet computer.

The scheduling timing is specified in 3GPP LTE Release 10. Here, the scheduling timing specifies a correspondence between the downlink subframes for transmitting scheduling information and uplink subframes scheduled by the scheduling information.

A problem that may exist in LTE Release 12 is presented in the document "R1-125117, 3GPP TSG RAN VVG1 Meeting #71, Qualcomm Inc.". A New Carrier Type (NCT) will be supported in LTE Release 12. In the NCT, the system shall continue supporting Multimedia Broadcast Multicast Service (MBMS), which will continue using the standardized configuration in LTE Release 12 and before. According to the standardized configuration in LTE Release 12 and before, radio resources for MBMS and radio resources for PDCCH are multiplexed in a time division manner in Multicast Broadcast Single Frequency Network (MBSFN) subframes. However, in LTE Release 12, in frequency bands dedicated to the NCT carrier (also referred to as "separate NCT"), the system uses ePDCCH instead of PDCCH. In this case, the radio resources for MBMS and radio resources for ePDCCH in the MBSFN subframes cannot coexist in one NOT carrier at the same time in a time division multiplexed manner. Therefore, in order to enable the MBMS in the NCT in a Time Division Duplex (TDD) mode to continue using the standardized configuration in LTE Release 12 and before, the scheduling timing of the uplink resources needs to be modified.

Therefore, there is a need for a new scheduling timing, so that, even if some downlink subframes are unavailable for transmitting scheduling information (for example, when they have been used for MBMS), the corresponding uplink subframes can still be scheduled, and the influence on the current standard can be minimized.

SUMMARY

It is an object of the present disclosure to solve at least some of the above problems.

According to a first aspect of the present disclosure, a method for transmitting scheduling information for scheduling an uplink subframe is provided. The method comprises: determining that a downlink subframe corresponding to the uplink subframe according to a first scheduling timing corresponding to a first Time Division Duplex (TDD) uplink and downlink configuration scheme of a plurality of TDD uplink and downlink configuration schemes is unavailable for transmitting the scheduling information; obtaining a first equivalent TDD uplink and downlink configuration scheme by treating one or more downlink subframes, including the downlink subframe, in a radio frame as uplink subframes; selecting a downlink subframe corresponding to the uplink subframe according to a second scheduling timing corresponding to a second TDD uplink and downlink configuration scheme of the plurality of TDD uplink and downlink configuration schemes, wherein a set of downlink subframes specified in the second TDD uplink and downlink configuration scheme is a subset of a set of downlink subframes specified in the first equivalent TDD uplink and downlink configuration scheme; and transmitting the scheduling information in the selected downlink subframe.

Preferably, if the first equivalent TDD uplink and downlink configuration scheme is the same as one of the plurality of TDD uplink and downlink configuration schemes, the second TDD uplink and downlink configuration scheme is the one of the plurality of TDD uplink and downlink configuration schemes that is the same as the first equivalent TDD uplink and downlink configuration scheme.

In an embodiment, the downlink subframe unavailable for transmitting the scheduling information is a downlink subframe used as a Multicast Broadcast Single Frequency Network (MBSFN) subframe.

In an embodiment, the one or more downlink subframes comprise all downlink subframes in the radio frame that are used as MBSFN subframes.

In an embodiment, the plurality TDD uplink and downlink configuration schemes are TDD uplink and downlink configuration schemes defined in 3GPP Release 10; and the first scheduling timing and the second scheduling timing are scheduling timings defined in 3GPP Release 10.

In an embodiment, the second TDD uplink and downlink configuration scheme is TDD uplink and downlink configuration scheme 0 defined in 3GPP Release 10.

According to a second aspect of the present disclosure, a method for transmitting scheduling information for scheduling an uplink subframe is provided. The method comprises: determining that a downlink subframe corresponding to the uplink subframe according to a first scheduling timing corresponding to a first Time Division Duplex (TDD) uplink and downlink configuration scheme of a plurality of TDD uplink and downlink configuration schemes is unavailable for transmitting the scheduling information; obtaining a first equivalent TDD uplink and downlink configuration scheme by treating one or more downlink subframes, including the downlink subframe, in a radio frame as uplink subframes; and selecting a downlink subframe corresponding to the uplink subframe according to a predetermined scheduling timing if the first equivalent TDD uplink and downlink configuration scheme is different from each of the plurality of TDD uplink and downlink configuration schemes. The predetermined scheduling timing is different from any scheduling timing corresponding to any of the plurality of TDD uplink and downlink configuration schemes. In the predetermined scheduling timing, the downlink subframe corresponding to the uplink subframe is set based on a time interval between the uplink subframe and the downlink subframe and a requirement on scheduling load balance.

According to a third aspect of the present disclosure, a base station for transmitting scheduling information for scheduling an uplink subframe is provided. The base station comprises: a determination unit configured to determine that a downlink subframe corresponding to the uplink subframe according to a first scheduling timing corresponding to a first Time Division Duplex (TDD) uplink and downlink configuration scheme of a plurality of TDD uplink and downlink configuration schemes is unavailable for transmitting the scheduling information; an obtaining unit configured to obtain a first equivalent TDD uplink and downlink configuration scheme by treating one or more downlink subframes, including the downlink subframe, in a radio frame as uplink subframes; a selection unit configured to select a downlink subframe corresponding to the uplink subframe according to a second scheduling timing corresponding to a second TDD uplink and downlink configuration scheme of the plurality of TDD uplink and downlink configuration schemes, wherein a set of downlink subframes specified in the second TDD uplink and downlink configuration scheme is a subset of a set of downlink subframes specified in the first equivalent TDD uplink and downlink configuration scheme; and a transmission unit configured to transmit the scheduling information in the selected downlink subframe.

Preferably, if the first equivalent TDD uplink and downlink configuration scheme is the same as one of the plurality of TDD uplink and downlink configuration schemes, the second TDD uplink and downlink configuration scheme is the one of the plurality of TDD uplink and downlink configuration schemes that is the same as the first equivalent TDD uplink and downlink configuration scheme.

In an embodiment, the downlink subframe unavailable for transmitting the scheduling information is a downlink subframe used as a Multicast Broadcast Single Frequency Network (MBSFN) subframe.

In an embodiment, the one or more downlink subframes comprise all downlink subframes in the radio frame that are used as MBSFN subframes.

In an embodiment, the plurality TDD uplink and downlink configuration schemes are TDD uplink and downlink configuration schemes defined in 3GPP Release 10; and the first scheduling timing and the second scheduling timing are scheduling timings defined in 3GPP Release 10.

In an embodiment, the second TDD uplink and downlink configuration scheme is TDD uplink and downlink configuration scheme 0 defined in 3GPP Release 10.

According to a fourth aspect of the present disclosure, a base station for transmitting scheduling information for scheduling an uplink subframe is provided. The base station comprises: a determination unit configured to determine that a downlink subframe corresponding to the uplink subframe according to a first scheduling timing corresponding to a first Time Division Duplex (TDD) uplink and downlink configuration scheme of a plurality of TDD uplink and downlink configuration schemes is unavailable for transmitting the scheduling information; an obtaining unit configured to obtain a first equivalent TDD uplink and downlink configuration scheme by treating one or more downlink subframes, including the downlink subframe, in a radio frame as uplink subframes; and a selection unit configured to select a downlink subframe corresponding to the uplink subframe according to a predetermined scheduling timing if the first equivalent TDD uplink and downlink configuration scheme is different from each of the plurality of TDD uplink and downlink configuration schemes; and a transmission unit configured to transmit the scheduling information in the selected downlink subframe. The predetermined scheduling timing is different from any scheduling timing corresponding to any of the plurality of TDD uplink and downlink configuration schemes. In the predetermined scheduling timing, the downlink subframe corresponding to the uplink subframe is set based on a time interval between the uplink subframe and the downlink subframe and a requirement on scheduling load balance.

With the embodiments of the present disclosure, even if some downlink subframes are unavailable for transmitting scheduling information (for example, when they have been used for MBMS), the corresponding uplink subframes can still be scheduled, and the influence on the current standard can be minimized.

BRIEF DESCRIPTION OF THE DRAWINGS

The above and other features of the present disclosure will become more apparent from the detailed description which is taken in conjunction with the accompanying drawings, in which.

DETAILED DESCRIPTION

The principles and implementations of the present disclosure will become more apparent from the following description of the embodiments of the present disclosure with reference to the drawings. It should be noted that the present disclosure is not limited to the embodiments given below. Further, for simplicity, details of well-known techniques irrelevant to the present disclosure are omitted so as not to obscure the concept of the disclosure.

Various embodiments of the present disclosure will be specifically described below by taking the LTE Release 12 mobile communication system and its subsequent, evolved releases as an exemplary application environment. However, it should be noted that the present disclosure is not limited to the following embodiments, but is applicable to other wireless communication systems, for example, a future 5G cellular communication system.

Figure 1:
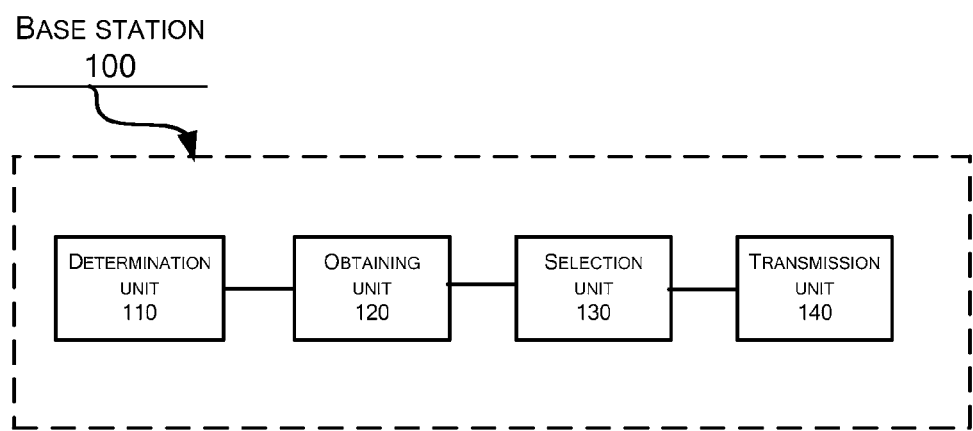
FIG. 1 is a block diagram of a base station according to the present disclosure.

FIG. 1 illustrates a block diagram of a base station 100 according to the present disclosure. As shown in FIG. 1, the base station 100 includes a determination unit 110, an obtaining unit 120, a selection unit 130 and a transmission unit 140. Those skilled in the art should understand that the base station 100 further includes other functional units required for implementing the functions thereof, for example, various processors, memories or the like.

According to the present disclosure, the base station 100 transmits scheduling information for scheduling an uplink subframe.

The determination unit 110 is configured to determine that a downlink subframe corresponding to the uplink subframe according to a first scheduling timing corresponding to a first Time Division Duplex (TDD) uplink and downlink configuration scheme of a plurality of TDD uplink and downlink configuration schemes is unavailable for transmitting the scheduling information.

The obtaining unit 120 is configured to obtain a first equivalent TDD uplink and downlink configuration scheme by treating one or more downlink subframes, including the downlink subframe, in a radio frame as uplink subframes.

The selection unit 130 is configured to select a downlink subframe corresponding to the uplink subframe according to a second scheduling timing corresponding to a second TDD uplink and downlink configuration scheme of the plurality of TDD uplink and downlink configuration schemes, wherein a set of downlink subframes specified in the second TDD uplink and downlink configuration scheme is a subset of a set of downlink subframes specified in the first equivalent TDD uplink and downlink configuration scheme.

The transmission unit 140 is configured to transmit the scheduling information in the selected downlink subframe.

Operations of various units in the base station 100 will be described by way of specific examples. It can be appreciated by those skilled in the art that the present disclosure is not limited to the specific examples described below. As long as corresponding units in the base station 100 operate in accordance with the principle of the present disclosure described above, the object of the present disclosure can be achieved.

First, according to the scheduling timing defined in 3GPP Release 10, scheduling information is transmitted in the n-th downlink subframe to schedule a (n+k)-th uplink subframe. Table 8-2 in 3GPP Technical Specification 26.213 specifies values of k corresponding to different TDD uplink and downlink configuration schemes. For example, in the TDD mode, downlink subframes used as MBSFN subframes are one or more of subframes with subframe numbers 3, 4, 7, 8 and 9. In the NCT in the TDD mode, when one or more of the downlink subframes with subframe numbers 3, 4, 7, 8 and 9 are used as MBSFN subframes, scheduling information cannot be transmitted in the downlink subframes used as MBSFN subframes.

It can be appreciated by those skilled in the art that if the above downlink subframes which have been used as MBSFN subframes and thus cannot be used for transmitting scheduling information are originally not designed to transmit the scheduling information according to the scheduling timing defined in 3GPP Release 10, there is no need to modify the scheduling timing.

On the other hand, if the above downlink subframes which have been used as MBSFN subframes and thus cannot be used for transmitting scheduling information are originally designed to transmit the scheduling information according to the scheduling timing defined in 3GPP Release 10, the scheduling timing needs to be modified.

Preferably, if the first equivalent TDD uplink and downlink configuration scheme obtained by the obtaining unit 120 is the same as one of the TDD uplink and downlink configuration schemes defined in the 3GPP Release 10, the one of the TDD uplink and downlink configuration schemes defined in the 3GPP Release 10 that is the same as the first equivalent TDD uplink and downlink configuration scheme can be selected by the selection unit 130 as the second TDD uplink and downlink configuration scheme.

Alternatively, a TDD uplink and downlink configuration scheme 0 defined in 3GPP Release 10 can be selected by the selection unit 130 as the second TDD uplink and downlink configuration scheme. According to 3GPP Release 10, a set of downlink subframes specified in the TDD uplink and downlink configuration scheme 0 is a subset of a set of downlink subframes specified in any of the TDD uplink and downlink configuration schemes defined in 3GPP Release 10, and is thus a subset of a set of downlink subframes specified in the first equivalent TDD uplink and downlink configuration scheme (the set of downlink subframes specified in the first equivalent TDD uplink and downlink configuration scheme is a set of downlink subframes specified in the first TDD uplink and downlink configuration scheme).

Alternatively, if the first equivalent TDD uplink and downlink configuration scheme obtained by the obtaining unit 120 is different from each of the TDD uplink and downlink configuration schemes defined in the 3GPP Release 10, a downlink subframe corresponding to the uplink subframe to be scheduled is selected by the selection unit 130 according to a predetermined scheduling timing. Here, the predetermined scheduling timing is different from any scheduling timing corresponding to any of the TDD uplink and downlink configuration schemes defined in the 3GPP Release 10. In addition, in the predetermined scheduling timing, the downlink subframe corresponding to the uplink subframe to be scheduled is set based on a time interval between the uplink subframe to be scheduled and the downlink subframe and a requirement on scheduling load balance.

For example, an uplink subframe l may be scheduled by a downlink subframe l-k which is closest in time to the uplink subframe l. The downlink subframe l-k is used to carry ePDCCH (which can be used for transmitting scheduling information) and k is larger than or equal to 4. According to this principle, when subframes 1 and 6 are used to carry ePDCCH, k may be shown in Table 1 below.

TABLE 1

Values of k for different TDD uplink and downlink configuration schemes and MBSFN subframe configurations

| TDD uplink and downlink configuration schemes | MBSFN subframe numbers | #0 | #1 | #2 | #3 | #4 | #5 | #6 | #7 | #8 | #9 |
|---|---|---|---|---|---|---|---|---|---|---|---|
| 1 | #4 | | 6, 7 | | | | | 6 | | | 4 |
| | #9 | | 6 | | | 4 | | 6,7 | | | |
| | #4, #9 | | 6, 7 | | | | | 6, 7 | | | |
| 2 | #3 | | 6 | | | | | | | 4 | |
| | #8 | | | | | 4 | | 6 | | | |
| | #3, #8 | | 6 | | | | | 6 | | | |
| 3 | #9 | 4 | | | | | | | | 4, 5 | |
| | #7, #9 | 4 | | | | | | | | 4, 5 | |
| | #8 | 4 | | | | | | | 5 | | 4 |
| | #8, #9 | 4 | | | | | | 6 | 6 | | |
| | #7, #8 | 4 | | | | | | 6 | | | 4 |
| | #7, #8, #9 | 4 | | | | | 7 | 7 | | | |
| 4 | #9 | | | | | | | | | 4, 5 | |
| | #7, #9 | | | | | | | | | 4, 5 | |
| | #8 | | | | | | | | 5 | | 4 |
| | #8, #9 | | | | | | | 6 | 6 | | |
| | #7, #8 | | | | | | | 6 | | | 4 |
| | #7, #8, #9 | | | | | | 7 | 7 | | | |

TABLE 1-continued

Values of k for different TDD uplink and downlink configuration schemes and MBSFN subframe configurations

| TDD uplink and downlink configuration schemes | MBSFN subframe numbers | Subframe numbers | | | | | | | | | |
|---|---|---|---|---|---|---|---|---|---|---|---|
| | | #0 | #1 | #2 | #3 | #4 | #5 | #6 | #7 | #8 | #9 |
| 5 | #8 | | | | | | | | 5 | | |
| | #7, #8 | | | | | | | 6 | | | |
| 6 | #9 | 4, 7 | 7 | | | | 7 | 7 | | | |

It can be appreciated by those skilled in the art that the scheduling timing given in Table 1 is merely an example, and the present disclosure is not limited to the scheduling timing shown in Table 1. Instead, as long as the downlink subframe corresponding to the uplink subframe to be scheduled is set based on a time interval between the uplink subframe to be scheduled and the downlink subframe and the requirement on scheduling load balance, the principle of the present disclosure can be achieved.

Alternatively, for an NCT carrier, if the system supports inter-carrier scheduling and there is one or more non-NCT carriers (i.e., conventional carriers) having an inter-carrier scheduling capability, the base station can apply the inter-carrier scheduling. On the other hand, if the system does not support inter-carrier scheduling, or if there is no conventional carrier in the system, or if the conventional carrier in the system does not have the inter-carrier scheduling capability (for example, the conventional carrier is too far away from the NCT carrier in frequency), the above solutions can be used. Here, the inter-carrier scheduling can still utilize the existing TDD scheduling timing defined in LTE Release 10, but the scheduling information for the NCT carrier can be transmitted on a downlink control channel (PDCCH/ePDCCH) in another carrier. For example, when an uplink subframe l cannot be scheduled by a downlink subframe l-k on the same carrier, the uplink subframe l can be scheduled in an inter-carrier manner by a downlink subframe l-k in another carrier.

It can be appreciated by those skilled in the art that, although the embodiments of the present disclosure have been described by taking the MBMS scenario in an NOT in the FDD mode as an example, the reason for which the downlink subframe cannot be used for transmitting scheduling information is not limited to it being used for MBMS, and the present disclosure is not limited to such application scenario.

The principle of the present disclosure will be described in detail below by way of specific examples. However, the examples given below are merely illustrative, and the principle of the present disclosure is not limited to the following specific implementations.

Example 1

TDD Uplink and Downlink Configuration Scheme 3, with Downlink Subframe #7 Used as MBSFN Subframe According to the TDD uplink and downlink configuration scheme 3 and its corresponding scheduling timing defined in 3GPP Release 10, downlink subframes #8 and #9 are used for transmitting scheduling information; and the downlink subframe #7 is not used for transmitting scheduling information. Therefore, when the downlink subframe #7 is used as an MBSFN subframe, the scheduling timing does not need to be modified.

Example 2

TDD Uplink and Downlink Configuration Scheme 3, with Downlink Subframes #7 and #8 Configured as MBSFN Subframes According to the TDD uplink and downlink configuration scheme 3 and its corresponding scheduling timing defined in 3GPP Release 10, downlink subframes #8 and #9 are used for transmitting scheduling information. Therefore, the downlink subframe #8 may be used for transmitting the scheduling information to schedule an uplink subframe #2 of a next radio frame. In this case, the scheduling timing needs to be modified.

The obtaining unit 120 obtains an equivalent TDD uplink and downlink configuration scheme by treating the MBSFN subframes #7 and #8 as uplink subframes. In this case, the obtained equivalent TDD uplink and downlink configuration scheme is the same as a TDD uplink and downlink configuration scheme 6 defined in 3GPP Release 10. Therefore, the TDD uplink and downlink configuration scheme 6 is selected by the selection unit 130 as a second TDD uplink and downlink configuration scheme, and the scheduling information is transmitted according to a scheduling timing corresponding to the TDD uplink and downlink configuration scheme 6, to schedule uplink subframes #2, #3 and #4 of the next radio frame. Specifically, the scheduling information is transmitted in the downlink subframe #5 to schedule the uplink subframe #2 of the next radio frame; the scheduling information is transmitted in the downlink subframe #6 to schedule the uplink subframe #3 of the next radio frame; and the scheduling information is transmitted in the downlink subframe #9 to schedule the uplink subframe #4 of the next radio frame.

Alternatively, the scheduling information may be transmitted according to the scheduling timing defined in Table 1, to schedule the uplink subframes #2, #3 and #4 of the next radio frame. Specifically, the scheduling information is transmitted in the downlink subframe #6 to schedule the uplink subframe #2 of the next radio frame; the scheduling information is transmitted in the downlink subframe #9 to schedule the uplink subframe #3 of the next radio frame; and the scheduling information is transmitted in the downlink subframe #0 to schedule the uplink subframe #4 of the next radio frame.

Alternatively, as described above, when an uplink subframe l cannot be scheduled by a downlink subframe l-k of the same carrier, the uplink subframe 1 can be scheduled in an inter-carrier manner using a downlink subframe 1-k of another carrier.

Example 3

TDD Uplink and Downlink Configuration Scheme 3, with Downlink Subframes #8 and #9 Configured as MBSFN Subframes According to the TDD uplink and downlink configuration scheme 3 and its corresponding scheduling timing defined in 3GPP Release 10, the downlink subframes #8 and #9 are used for transmitting scheduling information. Therefore, the downlink subframes 8 and #9 may be used for transmitting the scheduling information to schedule uplink subframes #2 and #3 of a next radio frame. In this case, the scheduling timing needs to be modified.

The obtaining unit 120 obtains an equivalent TDD uplink and downlink configuration scheme by treating the MBSFN subframes #8 and #9 as uplink subframes. In this case, the obtained equivalent TDD uplink and downlink configuration scheme is different from each of the TDD uplink and downlink configuration schemes defined in 3GPP Release 10. Therefore, the TDD uplink and downlink configuration scheme 0 is selected by the selection unit 130 as a second TDD uplink and downlink configuration scheme, and the scheduling information is transmitted according to a scheduling timing corresponding to the TDD uplink and downlink configuration scheme 0, to schedule uplink subframes #2, #3 and #4 of the next radio frame. Specifically, the scheduling information is transmitted in the downlink subframe #6 to schedule the uplink subframe #2 of the next radio frame; the scheduling information is transmitted in the downlink subframe #6 to schedule the uplink subframe #3 of the next radio frame; and the scheduling information is transmitted in the downlink subframe #0 to schedule the uplink subframe #4 of the next radio frame.

Alternatively, the scheduling information may be transmitted according to the scheduling timing defined in Table 1, to schedule the uplink subframes #2, #3 and #4 of the next radio frame. Specifically, the scheduling information is transmitted in the downlink subframe #6 to schedule the uplink subframe #2 of the next radio frame; the scheduling information is transmitted in the downlink subframe #7 to schedule the uplink subframe #3 of the next radio frame; and the scheduling information is transmitted in the downlink subframe #0 to schedule the uplink subframe #4 of the next radio frame.

Alternatively, as described above, when an uplink subframe 1 cannot be scheduled by a downlink subframe 1-k of the same carrier, the uplink subframe 1 is scheduled in an inter-carrier manner using a downlink subframe 1-k of another carrier.

A flowchart of a method for transmitting scheduling information according to the present disclosure will be described below with reference to accompanying drawings. In the following description, for clarity, the method according to the present disclosure will be described in combination with the specific embodiments of the base station 100 described above. However, it can be appreciated by those skilled in the art that the method according to the present disclosure is described in combination with specific functional units of the base station described above merely for purpose of illustration, and in a case where the method is implemented for example by using computer programs, there is no need to divide the base station into the functional units and components, and the method according to the present disclosure is performed by the base station as a whole. All features described in combination with the embodiments of the base station 10 described above are also applicable to the following method embodiments.

Figure 2:
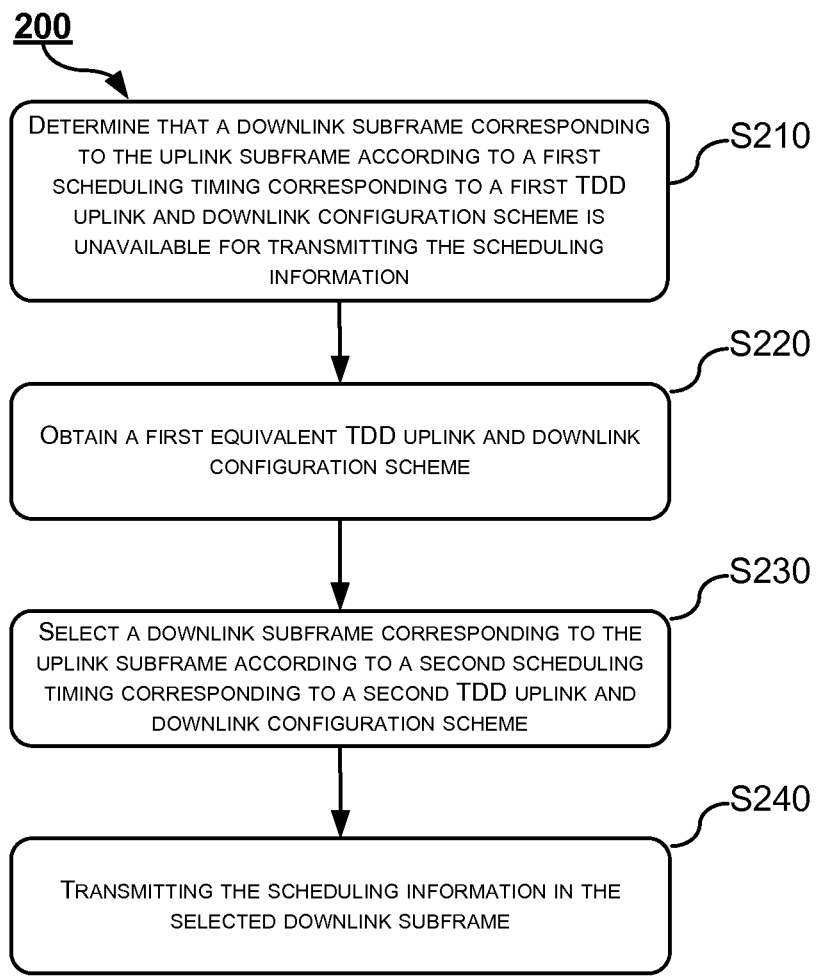
FIG. 2 is a flowchart of a method for transmitting scheduling information according to the present disclosure.

FIG. 2 illustrates a flowchart of a method 200 for transmitting scheduling information according to the present disclosure. The method 200 may be performed by the base station 100, and includes the following steps.

At step S210, the determination unit 110 determines that a downlink subframe corresponding to the uplink subframe according to a first scheduling timing corresponding to a first Time Division Duplex (TDD) uplink and downlink configuration scheme of a plurality of TDD uplink and downlink configuration schemes is unavailable for transmitting the scheduling information.

At step S220, the obtaining unit 120 obtains a first equivalent TDD uplink and downlink configuration scheme by treating one or more downlink subframes, including the downlink subframe, in a radio frame as uplink subframes.

At step S230, the selection unit 130 selects a downlink subframe corresponding to the uplink subframe according to a second scheduling timing corresponding to a second TDD uplink and downlink configuration scheme of the plurality of TDD uplink and downlink configuration schemes, wherein a set of downlink subframes specified in the second TDD uplink and downlink configuration scheme is a subset of a set of downlink subframes specified in the first equivalent TDD uplink and downlink configuration scheme.

At step S240, the transmission unit 140 transmits the scheduling information in the selected downlink subframe.

Preferably, in step S230, if the first equivalent TDD uplink and downlink configuration scheme is the same as one of the plurality of TDD uplink and downlink configuration schemes, the second TDD uplink and downlink configuration scheme is the one of the plurality of TDD uplink and downlink configuration schemes that is the same as the first equivalent TDD uplink and downlink configuration scheme.

In an embodiment, the downlink subframe unavailable for transmitting the scheduling information is a downlink subframe used as a Multicast Broadcast Single Frequency Network (MBSFN) subframe.

In an embodiment, the one or more downlink subframes comprise all downlink subframes in the radio frame that are used as MBSFN subframes.

In an embodiment, the plurality TDD uplink and downlink configuration schemes are TDD uplink and downlink configuration schemes defined in 3GPP Release 10. The first scheduling timing and the second scheduling timing are scheduling timings defined in 3GPP Release 10.

In an embodiment, the second TDD uplink and downlink configuration scheme is TDD uplink and downlink configuration scheme 0 defined in 3GPP Release 10.

Alternatively, the selection unit 130 selects a downlink subframe corresponding to the uplink subframe according to a predetermined scheduling timing if the first equivalent TDD uplink and downlink configuration scheme is different from each of the plurality of TDD uplink and downlink configuration schemes. The predetermined scheduling timing is different from any scheduling timing corresponding to any of the plurality of TDD uplink and downlink configuration schemes. In the predetermined scheduling timing, the downlink subframe corresponding to the uplink subframe is set based on a time interval between the uplink subframe and the downlink subframe and a requirement on scheduling load balance.

With the embodiments of the present disclosure, even if some downlink subframes are unavailable for transmitting scheduling information (for example, when they have been used for MBMS), the corresponding uplink subframes can still be scheduled, and the influence on the current standard can be minimized.

The present disclosure has been described above with reference to the preferred embodiments thereof. However, it should be understood that various modifications, substitutions and alternations can be made by those skilled in the art without departing from the spirits and scope of the present disclosure. Therefore, the scope of the present disclosure is not limited to the above particular embodiments, but only defined by the claims as attached and the equivalents thereof.

The invention claimed is:

1. A method for transmitting scheduling information for scheduling of an uplink subframe, the method comprising:
   determining whether or not a Multicast Broadcast Single Frequency Network (MBSFN) subframe is used for transmitting the scheduling information for scheduling of the uplink subframe, the scheduling of the uplink subframe being based on a first scheduling timing, the first scheduling timing being determined based on a first Time Division Duplex (TDD) uplink and downlink configuration scheme;
   obtaining a first equivalent TDD uplink and downlink configuration scheme from the first TDD uplink and downlink configuration scheme in a case that the MBSFN subframe is not used for transmitting the scheduling information for scheduling of the uplink subframe, the first equivalent TDD uplink and downlink configuration scheme being obtained by assuming the MBSFN subframe as the uplink subframe;
   selecting a downlink subframe used for transmitting the scheduling information for scheduling of the uplink subframe, the downlink subframe being selected based on the first equivalent TDD uplink and downlink configuration scheme and a second TDD uplink and downlink configuration scheme; and
   transmitting in the selected downlink subframe, the scheduling information for scheduling of the uplink subframe, the scheduling of the uplink subframe being based on a second scheduling timing, the second scheduling timing being determined based on the first equivalent TDD uplink and downlink configuration scheme and the second TDD uplink and downlink configuration scheme, wherein
   the first scheduling timing and the second scheduling timing are different.

2. A base station apparatus for transmitting scheduling information for scheduling an uplink subframe, the base station apparatus comprising:
   determination circuitry configured to determine whether or not a Multicast Broadcast Single Frequency Network (MBSFN) subframe is used for transmitting the scheduling information for scheduling of the uplink subframe, the scheduling of the uplink subframe being based on a first scheduling timing, the first scheduling timing being determined based on a first Time Division Duplex (TDD) uplink and downlink configuration scheme;
   obtaining circuitry configured to obtain a first equivalent TDD uplink and downlink configuration scheme from the first TDD uplink and downlink configuration scheme in a case that the MBSFN subframe is not used for transmitting the scheduling information for scheduling of the uplink subframe, the first equivalent TDD uplink and downlink configuration scheme being obtained by assuming the MBSFN subframe as the uplink subframe;
   selection circuitry configured to select a downlink subframe used for transmitting the scheduling information for scheduling of the uplink subframe, the downlink subframe being selected based on the first equivalent TDD uplink and downlink configuration scheme and a second TDD uplink and downlink configuration scheme; and
   transmission circuitry configured to transmit in the selected downlink subframe, the scheduling information for scheduling of the uplink subframe, the scheduling of the uplink subframe being based on a second scheduling timing, the second scheduling timing being determined based on the first equivalent TDD uplink and downlink configuration scheme and the second TDD uplink and downlink configuration scheme, wherein
   the first scheduling timing and the second scheduling timing are different.

3. A mobile station apparatus for receiving scheduling information for scheduling an uplink subframe, the mobile station apparatus comprising:
   determination circuitry configured to determine whether or not a Multicast Broadcast Single Frequency Network (MBSFN) subframe is used for receiving the scheduling information for scheduling of the uplink subframe, the scheduling of the uplink subframe being based on a first scheduling timing, the first scheduling timing being determined based on a first Time Division Duplex (TDD) uplink and downlink configuration scheme;
   obtaining circuitry configured to obtain a first equivalent TDD uplink and downlink configuration scheme from the first TDD uplink and downlink configuration scheme in a case that the MBSFN subframe is not used for receiving the scheduling information for scheduling of the uplink subframe, the first equivalent TDD uplink and downlink configuration scheme being obtained by assuming the MBSFN subframe as the uplink subframe;
   selection circuitry configured to select a downlink subframe used for receiving the scheduling information for scheduling of the uplink subframe, the downlink subframe being selected based on the first equivalent TDD uplink and downlink configuration scheme and a second TDD uplink and downlink configuration scheme; and
   reception circuitry configured to receive in the selected downlink subframe, the scheduling information for scheduling of the uplink subframe, the scheduling of the uplink subframe being based on a second scheduling timing, the second scheduling timing being determined based on the first equivalent TDD uplink and downlink configuration scheme and the second TDD uplink and downlink configuration scheme, wherein
   the first scheduling timing and the second scheduling timing are different.

* * * * *